United States Patent [19]
Keppel et al.

[11] 3,770,078
[45] Nov. 6, 1973

[54] DOOR LOCK ASSEMBLY AND DOOR RETRACTOR INTERLOCK

[75] Inventors: Charles M. Keppel, Holly; Irwin K. Weiss, Birmingham, both of Mich.

[73] Assignee: General Motors Corporation, Detroit, Mich.

[22] Filed: June 25, 1971

[21] Appl. No.: 156,808

[52] U.S. Cl................. 180/111, 180/82 C, 180/113, 280/150 SB, 297/388
[51] Int. Cl.......................................... B60r 21/10
[58] Field of Search.............. 280/150 SB; 180/111, 180/112, 113, 103, 82 C; 297/385, 386, 387, 388, 389

[56] References Cited
UNITED STATES PATENTS

| | | | |
|---|---|---|---|
| 3,411,602 | 11/1968 | Royce | 180/82 C |
| 3,593,816 | 7/1971 | Kazaoka | 180/113 |
| 3,506,083 | 4/1970 | Botnick et al. | 180/82.8 |
| 2,858,144 | 10/1958 | Oppenheim | 280/150 SB |
| 3,022,089 | 2/1962 | Botar | 280/150 SB |
| 3,219,361 | 11/1965 | Brown | 180/111 X |
| 3,549,203 | 12/1970 | Rawson | 280/150 SB X |
| 2,825,581 | 3/1958 | Knight | 280/150 SB |

*Primary Examiner*—Kenneth H. Betts
*Assistant Examiner*—John P. Silverstrim
*Attorney*—W. E. Finken et al.

[57] ABSTRACT

A vehicle body defines an occupant compartment and includes a seat mounted within the compartment and accessible through a side door opening selectively opened and closed by a side door, a belt arrangement with lap and shoulder belts whose first ends are secured adjacent an inboard portion of the seat and whose second ends are respectively received by a door mounted locking retractor and a vehicle body mounted inertia retractor, door and roof rail mounted carriers slidably receiving respective intermediate portions of the lap and shoulder belts, drive mechanisms for moving the carriers between forward and rearward positions in response to an operative condition of the vehicle to move the belts between easy-enter and occupant restraining positions, a door lock assembly mounted on the rear edge of the door and having a latch mechanism movable to a latched position to maintain the door in closed position and a lock mechanism movable to a locked position to prevent movement of the latch mechanism from latched position to unlatched position, a solenoid connected to the lock mechanism by a linkage and actuatable in response to the operative vehicle condition to move the lock mechanism to locked position, and a linkage connecting the solenoid and a locking bar of the locking retractor to move the locking bar to a locked position concomitant with the movement of the lock mechanism to locked position and thereby locking the retractor to prevent extending movement of the lap belt when the vehicle is in the operative condition.

3 Claims, 6 Drawing Figures

INVENTORS
Charles M. Keppel, &
BY Irwin K. Weiss
Herbert Furman
ATTORNEY

PATENTED NOV 6 1973

INVENTORS
Charles M. Keppel, &
BY Irwin K. Weiss

Herbert Furman
ATTORNEY

DOOR LOCK ASSEMBLY AND DOOR RETRACTOR INTERLOCK

This invention relates to an interlock for a vehicle body door lock assembly and a door mounted occupant restraining belt locking retractor.

It is conventional for a vehicle body door to support a lock assembly having a latch mechanism and a lock mechanism, with the latch mechanism being selectively moved to a latched position to maintain the door in a closed position, and with the lock mechanism being selectively moved to a locked position to prevent unlatching of the latch mechanism and the consequent possibility of door opening movement. It is also conventional to provide a power operated mechanism, such as a solenoid or a pneumatic motor, for moving the lock mechanism to locked position in response to an operative vehicle condition, such as vehicle ignition or ignition and the subsequent placement of the transmission selector lever in a driving position, etc. It is also known to provide a vehicle body door mounted occupant restraining belt locking retractor including a solenoid and spring biased armature arm for locking the retractor in response to an operative vehicle condition to prevent belt movement in both retracting and extending directions. Likewise, it is known to provide the door mounted locking retractor with a member that overlies a portion of the vehicle body to limit door opening movement when the retractor is locked and the vehicle is in the operative condition.

This invention utilizes a power operated mechanism responsive to an operative vehicle condition and an interlock for concomitantly locking the lock mechanism of a vehicle body door lock assembly and a door mounted belt locking retractor to prevent door opening movement and belt extending movement.

In the preferred embodiment of the invention, the power operated mechanism and interlock are used with a vehicle body having a belt arrangement in which door mounted and roof rail mounted carriers slidably receive intermediate portions of lap and shoulder belts and move forwardly and rearwardly in response to an operative vehicle condition to move the belts between easy-enter and occupant restraining positions. Linkages connect the power operated mechanism to the lock mechanism of the door lock assembly mounted on the vehicle body door associated with the belt arrangement and also connect the power operated mechanism to the locking bar of a locking retractor mounted on the door and receiving the outboard end of the lap belt. Concomitant with the placement of the vehicle in the operative condition and the initial rearward movement of the carriers and movement of the belts toward the restraining positions, the power operated mechanism is actuated and through the linkages locks the lock mechanism of the door lock assembly and also locks the locking retractor to prevent subsequent extending movement of the lap belt prior to cessation of the operative vehicle condition. When the vehicle ceases to be in the operative condition, the power operated mechanism unlocks the lock mechanism and the locking retractor as the carriers move forwardly to move the belts to the easy-enter positions.

Accordingly, an object of this invention is to provide a power operated mechanism responsive to an operative vehicle condition and an interlock for concomitantly locking a lock mechanism of a vehicle body door lock assembly and a door mounted belt locking retractor to prevent door opening movement and belt extending movement.

Another object of this invention is to utilize such a power operated mechanism and interlock with a belt arrangement having a belt with one end received by the locking retractor and with an intermediate portion slidably received by a carrier that is moved forwardly and rearwardly in response to the operative vehicle condition to move the belt arrangement between easy-enter and occupant restraining positions.

These objects and other objects of this invention will be readily apparent from the following detailed description and drawings in which:

FIG. 1 is a view of a portion of a vehicle that includes a power operated mechanism responsive to an operative vehicle condition and an interlock for concomitantly locking the lock mechanism of a door lock assembly and a door mounted locking retractor receiving one end of a lap belt of an occupant restraining belt arrangement, with certain vehicle body outer panels broken away to show a drive mechanism for moving a carrier that slidably receives an intermediate portion of the lap belt and moves the lap belt between easy-enter and occupant restraining positions in response to the operative vehicle condition;

Figure 5:
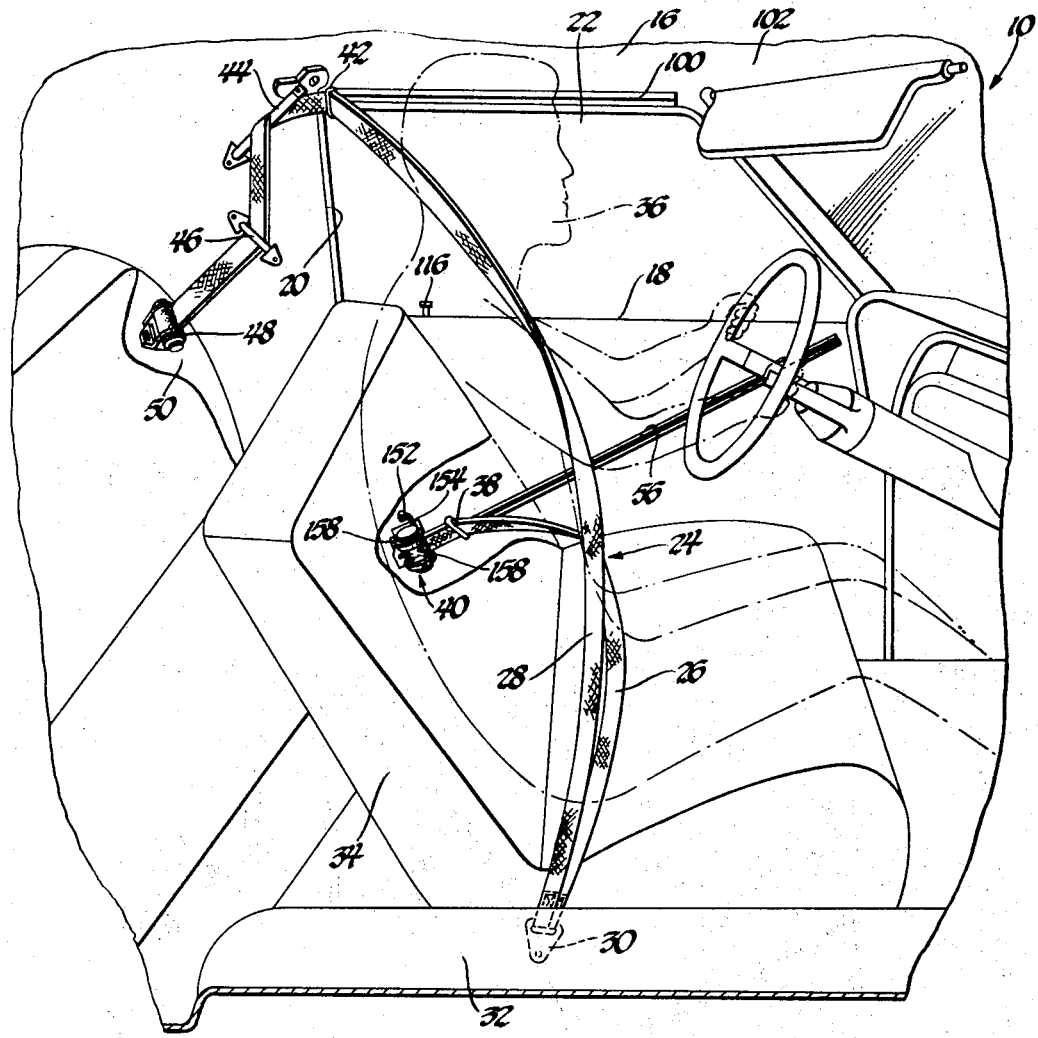
Figure 6:
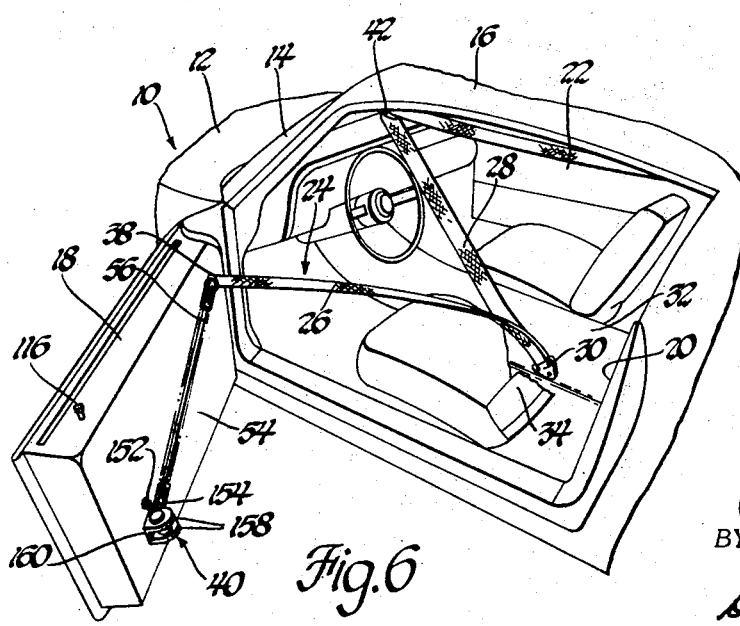

FIG. 5 is a perspective view of a portion of the interior of the vehicle showing the belt arrangement in an occupant restraining position with respect to a phantom line indicated seated occupant, as when the vehicle is in the operative condition; and FIG. 6 is a view of a portion of the vehicle with the door in open position and the belt arrangement in an easy-enter position, allowing convenient occupant access to a vehicle seat shown partially broken away.

Figures 1, 2, 3, 4:
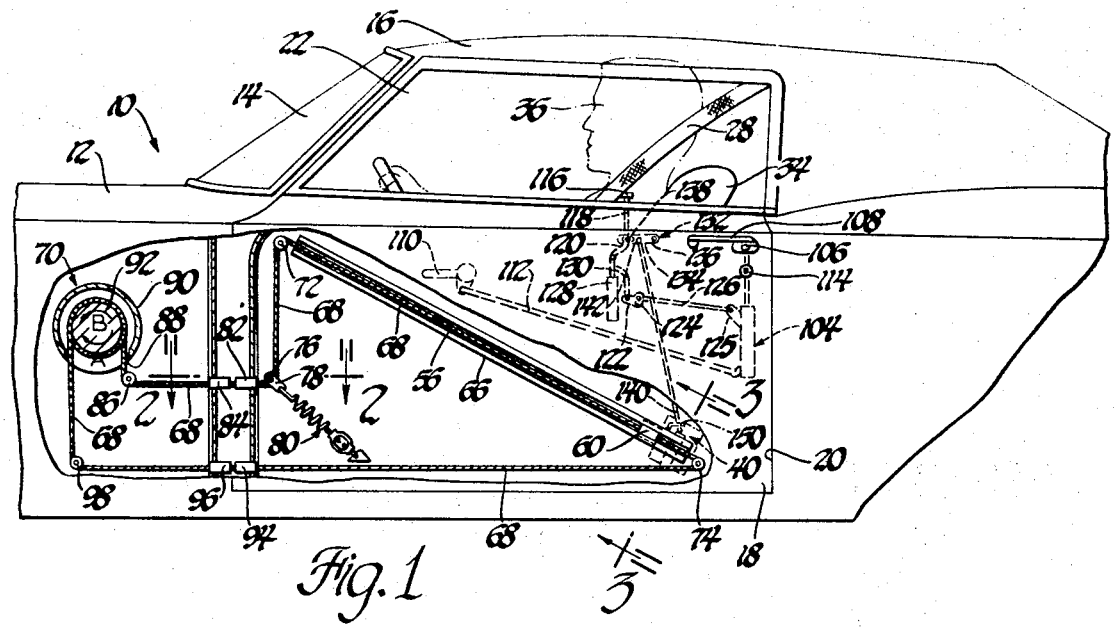
FIG. 2 is an enlarged sectional view of a portion of the vehicle body taken generally along line 2–2 of FIG. 1 and showing a cable and vehicle body and door mounted cable guides of the drive mechanism.
FIG. 3 is an enlarged sectional view of the vehicle body door taken along line 3–3 of FIG. 1 and showing opposed track members for mounting a slide that supports the carrier associated with the lap belt.
FIG. 4 is an enlarged perspective view of the door mounted locking retractor and a lower portion of a link controlling movement of a locking bar of the retractor.

Referring now to the drawings, and more particularly to FIG. 1, a vehicle generally indicated by 10 includes a conventional vehicle body 12 having the usual front windshield 14 and roof 16. The forward end of a side door 18 is conventionally pivotally mounted on the body 12 to support the door for movement between open and closed positions with respect to a side door opening 20, allowing occupant access to an occupant compartment generally indicated by 22. Referring additionally now to FIGS. 5 and 6, an occupant restraining belt arrangement generally indicated by 24 includes lap and shoulder belts 26 and 28 having their first ends fixedly secured to a bracket 30 mounted on the vehicle transmission tunnel 32 inboard of a bucket type seat 34. As best seen in FIG. 5, the lap belt 26 extends in a generally lateral direction across the lap of a phantom line indicated seated occupant 36 and has an intermediate portion slidably received by an apertured carrier 38 movable along door 18 as will be described. The other end of lap belt 26 is received by a locking retractor 40 suitably mounted on a lower rearward portion of door 18, as best seen in FIG. 6. In a similar manner, the shoulder belt 28 extends across the chest of occupant 36 and through an apertured carrier 42 slidably mounted along the roof rail of roof 16 as will be described. From carrier 42, shoulder belt 28 extends rearwardly and over body mounted rollers 44 and 46 to a conventional inertia retractor 48 mounted on the rear wheel well 50 of vehicle body 12.

As more clearly seen in FIGS. 1 and 3, carrier 38 slidably receives belt 26 in an elongated aperture 52 adjacent an inner trim panel 54 of door 18. Trim panel 54 includes an elongated slot 56 extending between upper forward and lower rearward portions of door 18, see FIGS. 1 and 5. A shank portion 58 of a slide 60 is received within slot 56 and attached to carrier 38 by screws 62. The slide 60 includes oppositely extending ears 64 slidably received within a pair of opposed track members 66 suitably mounted within door 18 and extending parallel to slot 56, FIG. 1.

As best seen in FIG. 1, a cable 68 of a drive mechanism 70 is attached to the opposite ends of slide 60 and is guidingly received by door mounted upper and lower pulleys 72 and 74 adjacent the opposite ends of track members 66. From the upper pulley 72, cable 68 extends downwardly and is guidingly received by a bodily movable pulley 76 pivoted to a link 78 of a spring and turnbuckle arrangement 80 that maintains a predetermined tension in cable 68. As best seen in FIG. 2, from pulley 76, cable 68 extends forwardly through a door mounted guide 82 adjacent the door hinge axis and forwardly through a body mounted guide 84. Since the distance between the opposed free ends of guides 82 and 84 is relatively short and since the guides are positioned relatively close to the door hinge axis, the effective length of cable 68 will vary only slightly during swinging movement of door 18 between open and closed positions. Consequently, the spring of arrangement 80 is capable of expanding and contracting to move link 78 and the attached pulley 76 to adjustably maintain the required tension in cable 68. As seen in FIG. 1, cable 68 extends forwardly from guide 84 to a body mounted pulley 86, upwardly through a lower aperture 88 in a housing 90, and is wound around a driving pulley 92. The other end of cable 68 attached to slide 60 is guided by the lower pulley 74 adjacent the lower ends of track members 66 and extends forwardly through door and body mounted guides 94 and 96 positioned in a similar manner with respect to the door hinge axis as are guides 82 and 84. From guide 96, cable 68 extends forwardly to a body mounted pulley 98, upwardly through aperture 88 in housing 90, and is wound around driving pulley 92. Driving pulley 92 also includes a portion about which is wound another cable, not shown, guided by suitable guides and pulleys, not shown, in a manner similar to cable 68. The ends of this cable are connected to a slide attached to carrier 42 and supported by roof rail mounted track members, similar to track members 66, for movement between the forward and rearward ends of a slot 100 in the head-liner 102 of roof 16, FIG. 5.

Driving pulley 92 is connected to a suitable electric motor, not shown, whose terminals are connected across a source of power in a circuit. The circuit is responsive to an operative vehicle condition, such as ignition or ignition and placement of the transmission selector lever in a driving position, etc., to actuate the motor in one direction and rotate driving pulley 92 in the direction of arrow A. Since each of the wound portions of the cables has a point suitably secured to driving pulley 92, this rotation winds respective portions of the cables and unwinds other respective portions of the cables, the net effect being to move the carriers 38 and 42 rearwardly to the FIG. 5 positions. As the carriers move rearwardly, the normal retracting bias of retractors 40 and 48 maintains the belts 26 and 28 in a taut condition as the belts slide through the carriers. A suitable limit switch, not shown, is actuated by slide 60 of carrier 38 when the carriers reach the FIG. 5 rearward positions where the belts have assumed the occupant restraining positions shown, without requiring any deliberate effort on the part of the occupant. The actuation of this limit switch stops the motor and rearward movement of the carriers and the occupant 36 is thus passively restrained while nevertheless free to lean forward at a controlled rate, less than that which will lock inertia retractor 48, to operate the vehicle controls, etc.

When the vehicle ceases to be in the operative condition, the circuit actuates the motor in the opposite direction to rotate driving pulley 92 in the direction of arrow B. Since locking retractor 40 is then unlocked, as will be described, and since this rotation moves the carriers 38 and 42 forwardly at a rate less than that which will lock inertia retractor 48, the carriers move to the FIG. 6 forward positions and the belts 26 and 28 are moved to the easy-enter positions. With the belts in these positions, the occupant is allowed convenient egression from and access to the occupant compartment 22 and seat 34.

The movement of the carriers 38 and 42 between the forward and rearward positions and the sliding movement of belts 26 and 28 through the carriers during movement between the easy-enter and occupant restraining positions is similar to the carrier and belt movement disclosed by the U.S. Pat. of Keppel et al. 3,680,883 which is assigned to the assignee of the present invention.

A door lock assembly generally indicated by 104 is mounted on the rear portion of door 18, FIG. 1, and includes a latch mechanism, not shown in detail, movable between latched and unlatched positions with respect to a body mounted keeper, not shown, to selectively maintain the door 18 in the FIG. 1 closed position. Door lock assembly 104 is similar to door lock assemblies used on current production vehicles and as such will not be described in detail. The latch mechanism of lock assembly 104 may be moved from the latched position to the unlatched position, to open door 18, by depression of an outside push button 106 adjacent the rear end of an outside door handle 108, and may alternately be moved to the unlatched position by an inside remote handle 110 connected to the latch mechanism by a generally longitudinally extending link 112. Lock assembly 104 also includes a lock mechanism, not shown in detail, selectively movable from an unlocked position to a locked position to conventionally prevent movement of the latch mechanism from latched position to unlatched position by actuation of button 106 or handle 110 and to thus maintain the door 18 in closed position. From outside the vehicle 10, the lock mechanism of lock assembly 104 is controlled by locking and unlocking of a key cylinder 114 in a conventional manner. From within the vehicle 10, the lock mechanism may be controlled by conventional upward and downward movement of a garnish button 116. As can be seen in FIG. 1, garnish button 116 is supported on the upper end of a control link 118 including an intermediate bight portion 120. The lower end of link 118 is pivoted to a somewhat L-shaped link 122 pivoted to the door at 124. The upward and downward movement of the garnish button 116 thus selectively pivots the link 122 to move a locking bar 125 of the lock mechanism by way of a link 126 and thus controls movement of the lock mechanism between the locked and unlocked positions.

A solenoid 128 is suitably mounted within the door 18 and includes an armature arm 130 whose upper end is pivoted to the bight portion 120 of link 118. Solenoid 128 is connected in the circuit that controls the motor rotating driving pulley 92. When the vehicle is placed in the operative condition previously described, the solenoid 128 is actuated and armature arm 130 is moved downwardly to rotate link 122 about 124. The rotation of link 122 through link 126 thus moves locking bar 125 and the lock mechanism of lock assembly 104 is thus moved to locked position in the same manner as by manual downward depression of garnish button 116. The lock mechanism of lock assembly 104 is thus conventionally locked when vehicle 10 is placed in the operative condition without requiring any deliberate effort on the part of the occupant. When the vehicle is taken out of the operative condition, the circuit deactivates solenoid 128 whose armature arm 130 is then moved upwardly by a spring bias to move the lock mechanism of lock assembly 104 to unlocked position.

A linkage generally indicated in FIG. 1 by 132 includes a link 134 with one end pivoted to the door 18 at 136, slightly to the rear of the lower end of garnish button 116. The other end of link 134 includes a suitable slot that receives a laterally extending pin or extension 138 on link 118 just slightly above the bight portion 120. Linkage 132 also includes a link 140 whose upper end is pivoted to the intermediate portion of link 134 at 142 and which extends downwardly and slightly rearwardly from link 134 to the locking retractor 40. As seen in FIG. 4, the lower end of link 140 includes integral oppositely extending lateral ears 144 and a threaded end for receiving a suitable nut 146 having a rounded upper surface. Intermediate ears 144 and nut 146, the lower end of link 140 extends through an aperture 148 in the flattened end 150 of a locking bar extension 152. Extension 152 is supported by the upper end of a locking bar 154 whose opposite ends are received in like apertures 156 in flanges 158 of the retractor housing 160. The locking bar 154 is thus rotatable about an axis A in opposite directions as indicated by arrows C and D. When the locking bar 154 is rotated in the direction of arrow C, a locking edge, not shown, of the locking bar moves into engagement with teeth 162 of a roller rotatably mounted between flanges 158 and receiving lap belt 26. This engagement locks the roller to prevent extending movement of lap belt 26. It will be noted that link 140 assumes a generally skewed orientation with respect to axis A. Consequently, upon actuation of solenoid 128 or manual depression of the garnish button 116 and the resultant downward pivoting movement of link 134 and downward bodily shifting movement of link 140, the ears 144 engage the upper side of flattened end 150 and rotate the locking bar 154 in the direction of arrow C to lock the retractor 40 and prevent extending movement of lap belt 26.

Conversely, upon unlocking of the lock mechanism by either the garnish button 116 or the spring bias of armature arm 130, the link 140 is bodily shifted upwardly and the curved upper surface of nut 146 engages the lower side of flattened end 150 to rotate the locking bar 154 in the direction of arrow D. This rotation moves the locking edge of the locking bar out of engagement with teeth 162 and allows lap belt 26 to be extended from retractor 40. Since the spring bias of the armature arm 130 unlocks the lock mechanism of lock assembly 104 when the vehicle ceases to be in the operative condition, the retractor 40 will thus be concomitantly unlocked to allow extending movement of lap belt 26 from retractor 40 as the carriers 38 and 42 begin to move forwardly to move the belts 26 and 28 to the easy-enter positions, as previously described.

It can thus be seen that when an occupant enters the vehicle, the lap and shoulder belts 26 and 28 will be positioned in the FIG. 6 easy-enter positions and will allow convenient occupant access to the seat 34. When the door 18 is closed and the vehicle is placed in the operative condition, the drive mechanisms will move the carriers 38 and 42 rearwardly to the positions shown in FIG. 5 while the retractors 40 and 48 retract the belts which are thus moved to the occupant restraining positions. Concomitant with the initial rearward movement of the carriers, the solenoid 128 will be actuated to lock the lock mechanism of the door lock assembly 104 and will also, by way of linkage 132, lock the locking retractor 40 against extending movement of the lap belt 26. The solenoid 128 thus concomitantly locks both the lock mechanism of the door lock assembly and the door mounted locking retractor 40.

The invention thus provides a power operated mechanism and an improved interlock for concomitantly locking a vehicle body door lock assembly and a door mounted belt locking retractor in response to an operative vehicle condition to prevent door opening movement and belt extending movement.

What is claimed is:

1. In a vehicle body defining an occupant compartment, the combination comprising, a seat mounted within the occupant compartment and accessible through a vehicle body side door opening, a door for selectively opening and closing the door opening, latch means mounted on the door and selectively movable between latched and unlatched positions with respect to a vehicle body mounted keeper to selectively maintain the door in closed position, inside and outside door mounted latch release means for selectively moving the latch means from latched position to unlatched position to allow movement of the door from closed position to open position, locking means selectively movable between locked and unlocked positions to selectively prevent movement of the latch means from latched position to unlatched position, inside and outside door mounted lock control means for controlling the position of the locking means, a solenoid for moving the locking means to locked position in response to an operative condition of the vehicle, a locking retractor mounted on the door and including a locking bar movable between locked and unlocked positions to selectively lock and unlock the retractor against belt extending movement, a belt having one end received by the retractor, means for securing the other end of the belt adjacent an inboard portion of the seat to dispose the belt across a seated occupant in a restraining position when the door is in closed position, and interlocking linkage means connecting the solenoid and the locking bar to move the locking bar to locked position concomitant with the movement of the locking means to locked position and thereby maintaining the belt in the restraining position against extending movement when the vehicle is in the operative condition.

2. In a vehicle body defining an occupant compartment, the combination comprising, a seat mounted within the occupant compartment and accessible through a vehicle body side door opening, a door for selectively opening and closing the door opening, latch means mounted on the door and selectively movable between latched and unlatched positions with respect to a vehicle body mounted keeper to selectively maintain the door in closed position, inside and outside door mounted latch release means for selectively moving the latch means from latched position to unlatched position to allow movement of the door from closed position to open position, locking means selectively movable between locked and unlocked positions to selectively prevent movement of the latch means from latched position to unlatched position, inside and outside door mounted lock control means for controlling the position of the locking means, a solenoid for moving the locking means to locked position in response to an operative condition of the vehicle, a locking retractor mounted on the door and including a locking bar movable between locked and unlocked positions to selectively lock and unlock the retractor against belt extending movement, a lap belt having one end received by the retractor, means for securing the other end of the belt adjacent an inboard portion of the seat, means responsive to the operative condition of the vehicle and connected to the belt to move the belt forwardly to an easy-enter position upon cessation of the operative condition of the vehicle and to allow the retractor to move the belt rearwardly to a restraining position when the vehicle is placed in the operative condition with the door in closed position, and interlocking linkage means connecting the solenoid and the locking bar to move the locking bar to locked position concomitant with the movement of the locking means to locked position and thereby locking the retractor to maintain the belt in the restraining position against extending movement when the vehicle is in the operative condition, the solenoid unlocking the locking means and the retractor when the vehicle ceases to be in the operative condition to allow opening movement of the door and extending movement of the belt to the easy-enter position.

3. In a vehicle body defining an occupant compartment, the combination comprising, a seat mounted within the occupant compartment and accessible through a vehicle body side door opening, a door for selectively opening and closing the door opening, latch means mounted on the door and selectively movable between latched and unlatched positions with respect to a vehicle body mounted keeper to selectively maintain the door in closed position, inside and outside door mounted latch release means for selectively moving the latch means from latched position to unlatched position to allow movement of the door from closed position to open position, locking means selectively movable between locked and unlocked positions to selectively prevent movement of the latch means from latched position to unlatched position, inside and outside door mounted lock control means for controlling the position of the locking means, a solenoid for moving the locking means to locked position in response to an operative condition of the vehicle, a locking retractor mounted on the door and including a locking bar movable between locked and unlocked positions to selectively lock and unlock the retractor against belt extending movement, a lap belt having one end received by the retractor, means for securing the other end of the belt adjacent an inboard portion of the seat, door mounted means connected to an intermediate portion of the belt to move the belt forwardly to an easy-enter position upon cessation of the operative condition of the vehicle and to allow the retractor to retract the belt to an occupant restraining position in response to the operative condition of the vehicle, and interlocking linkage means extending between the solenoid and the locking bar of the retractor to move the locking bar to locked position concomitant with the movement of the locking means to locked position and thereby locking the retractor to maintain the belt in the restraining position against extending movement when the vehicle is in the operative condition, the solenoid unlocking the locking means and the retractor when the vehicle ceases to be in the operative condition to allow door opening movement and extending movement of the belt to the easy-enter position.

* * * * *